(12) United States Patent
Ma

(10) Patent No.: US 12,234,611 B2
(45) Date of Patent: Feb. 25, 2025

(54) WALL-CLOTH WITH A LAMINATED CORE COATED THROUGH INFILTRATION AND A METHOD FOR PREPARING THE SAME

(71) Applicant: SUZHOU HONGNI NEW-MATERIAL TECHNOLOGY LTD., CO., Suzhou (CN)

(72) Inventor: Zhiyong Ma, Suzhou (CN)

(73) Assignee: Suzhou Hongni New-Material Technology Ltd., Co., Suzhou (CN)

( * ) Notice: Subject to any disclaimer, the term of this patent is extended or adjusted under 35 U.S.C. 154(b) by 1205 days.

(21) Appl. No.: 16/970,316

(22) PCT Filed: Dec. 30, 2018

(86) PCT No.: PCT/CN2018/125958
§ 371 (c)(1),
(2) Date: Aug. 14, 2020

(87) PCT Pub. No.: WO2019/157878
PCT Pub. Date: Aug. 22, 2019

(65) Prior Publication Data
US 2021/0079596 A1 Mar. 18, 2021

(30) Foreign Application Priority Data

Feb. 16, 2018 (CN) .......................... 201810152535.9
Feb. 16, 2018 (CN) .......................... 201810152540.X
(Continued)

(51) Int. Cl.
*B32B 37/24* (2006.01)
*B32B 38/08* (2006.01)
(Continued)

(52) U.S. Cl.
CPC ............ *D21H 27/20* (2013.01); *B32B 38/08* (2013.01); *E04F 13/02* (2013.01);
(Continued)

(58) Field of Classification Search
CPC .. B32B 5/022; B32B 5/12; B32B 5/26; B32B 27/12; B32B 27/18; B32B 27/20;
(Continued)

(56) References Cited

U.S. PATENT DOCUMENTS 4,101,359 A 7/1978 Failliot

FOREIGN PATENT DOCUMENTS

CN 201092708 Y 7/2008
CN 103088711 A 5/2013
(Continued)

OTHER PUBLICATIONS

"JP2010001707_Machine Translation" is a machine translation of JP-2010001707-A. (Year: 2010).*

*Primary Examiner* — Michael A Tolin
(74) *Attorney, Agent, or Firm* — Hsuanyeh Law Group, PC

(57) ABSTRACT

The present invention disclosed a wall-cloth with a laminated core coated through infiltration, a method for making the same and a method for an object, wherein, the wall-cloth comprises a prime coating layer, a laminated core complex covered on the prime coating layer; wherein the laminated core complex comprises a second coating layer which can be transparent or semi-transparent and a fiber sheet encapsulated in the second coating layer; and wherein, the fiber sheet possesses a network structure formed by fiber or fibers, and the second coating layer permeates into the meshes of the network structure. According to the present invention, the texture is controlled, because the fiber sheet can be produced according to a standard and large scale method to obtain (Continued)

identical texture. Meanwhile, the wall-cloth made by the present invention has excellence breathability and great gas transmission.

8 Claims, 4 Drawing Sheets

(30) Foreign Application Priority Data

| Feb. 16, 2018 | (CN) | 201810152543.3 |
| Feb. 16, 2018 | (CN) | 201810152546.7 |
| Feb. 16, 2018 | (CN) | 201810152547.1 |
| Feb. 16, 2018 | (CN) | 201810152548.6 |
| Feb. 16, 2018 | (CN) | 201810152552.2 |
| Feb. 16, 2018 | (CN) | 201810152553.7 |
| Feb. 16, 2018 | (CN) | 201810152554.1 |
| Apr. 19, 2018 | (CN) | 201810352310.8 |

(51) Int. Cl.
*D21H 27/20* (2006.01)
*E04F 13/02* (2006.01)

(52) U.S. Cl.
CPC ..... *B32B 2037/243* (2013.01); *B32B 2255/02* (2013.01); *B32B 2255/26* (2013.01); *B32B 2607/02* (2013.01); *D06N 2211/063* (2013.01)

(58) Field of Classification Search
CPC ... B32B 37/02; B32B 37/24; B32B 2037/243; B32B 38/06; B32B 38/08; B32B 2038/0064; B32B 2255/02; B32B 2255/20; B32B 2255/26; B32B 2607/02; D04H 1/4291; D04H 3/14; D06N 7/0002; D06N 7/0094; D06N 2211/063; D21H 19/82; D21H 19/84; D21H 27/20; D21H 27/30; E04F 13/002; E04F 13/02; E04F 13/04; E04F 13/045; E04F 13/047
See application file for complete search history.

(56) References Cited

FOREIGN PATENT DOCUMENTS

| CN | 106585039 | A |   | 4/2017 |   |
| CN | 207582074 | U | * | 7/2018 |   |
| CN | 207582169 | U | * | 7/2018 |   |
| CN | 108661261 | A | * | 10/2018 | ............ E04F 13/02 |
| JP | 2004332306 | A |   | 11/2004 |   |
| JP | 2010001707 | A | * | 1/2010 |   |
| WO | WO-2018176256 | A1 | * | 10/2018 |   |

* cited by examiner

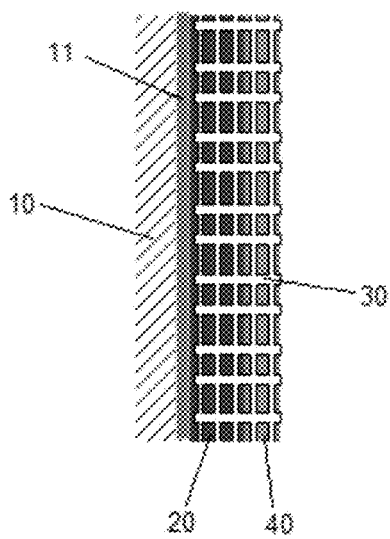
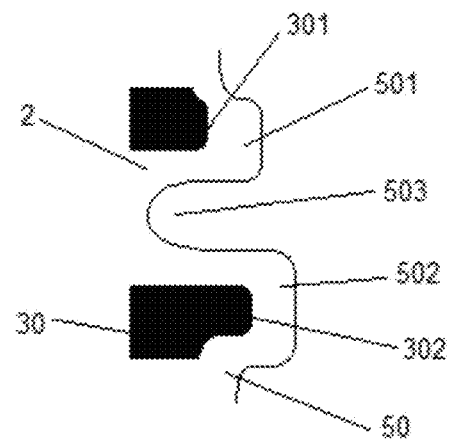
Figure 1A Figure 1B
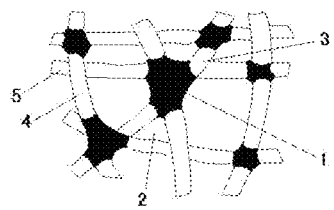 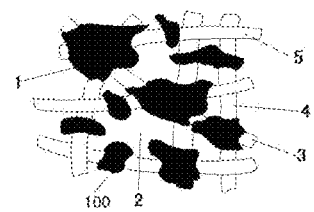 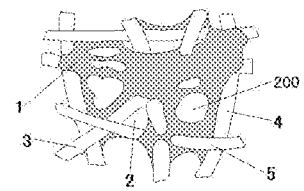
Figure 2A Figure 2B Figure 2C
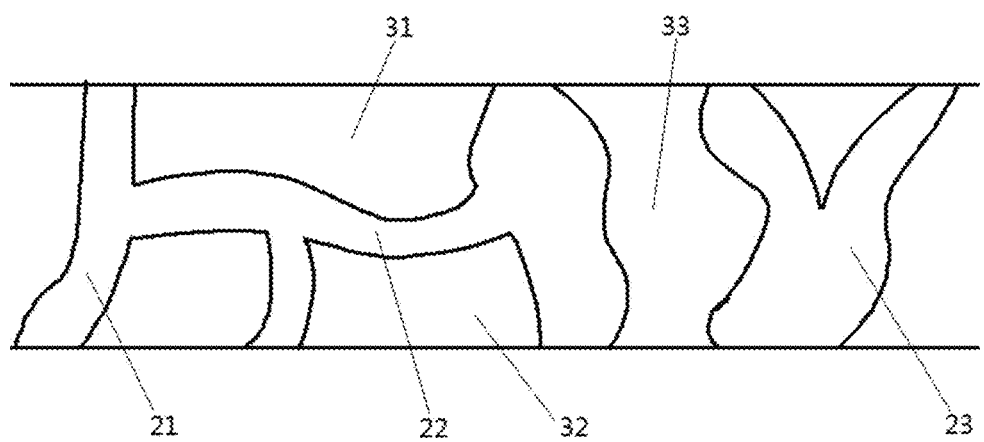
Figure 3

WALL-CLOTH WITH A LAMINATED CORE COATED THROUGH INFILTRATION AND A METHOD FOR PREPARING THE SAME

This application is a U.S. national stage entry of PCT Application No. PCT/CN2018/125958, filed on Dec. 30, 2018, the entire contents of which are incorporated herein by reference for all purposes.

The present application claims priorities from the following Chinese applications, which are hereby incorporated by reference in their entirety:

1. Application No. 201810152540.X filed on Feb. 16, 2018, named a wall-cloth with a laminated core coated through infiltration and a method for preparing the same;
2. Application No. 201810152547.1 filed on Feb. 16, 2018, named an alkali-resistant wall-cloth with a laminated core coated through infiltration and a method for preparing the same;
3. Application No. 201810352310.8 filed on Apr. 19, 2018, named a long-term antibacterial wall-cloth with a laminated core coated through infiltration and a method for preparing the same;
4. Application No. 201810152552.2 filed on Feb. 16, 2018, named an anti-graffiti wall-cloth with a laminated core coated through infiltration and a method for preparing the same;
5. Application No. 201810152548.6 filed on Feb. 16, 2018, named an insulation wall-cloth with a laminated core coated through infiltration and a method for preparing the same;
6. Application No. 201810152546.7 filed on Feb. 16, 2018, named a waterproofing wall-cloth with a laminated core coated through infiltration and a method for preparing the same;
7. Application No. 201810152553.7 filed on Feb. 16, 2018, named a fire-retardant wall-cloth with a laminated core coated through infiltration and a method for preparing the same;
8. Application No. 201810152554.1 filed on Feb. 26, 2018, named an electromagnetic shielding wall-cloth with a laminated core coated through infiltration and a method for preparing the same;
9. Application No. 201810152543.3 filed on Feb. 16, 2018, named a magnetic wall-cloth with a laminated core coated through infiltration and a method for preparing the same;
10. Application No. 201810152535.9 filed on Feb. 16, 2018, named a phase change energy storage wall-cloth with a laminated core coated through infiltration and a method for preparing the same;

TECHNICAL FILED

The present invention relates to ornaments on a surface of an object and methods for preparing the same, particularly, relates to methods for preparing wall-cloths with a laminated core coated through infiltration on a surface of a building etc., and the wall-cloths with a laminated core coated through infiltration.

BACKGROUND

A wall-cloth is an indoor ornament (in normal, a kind of textile) used pasted on a surface of a wall, with a printed design or a raised design. Generally, it is widely used for indoor decorating of dwelling houses, offices, hotels, restaurants, etc. The wall-cloth has some excellence characteristics, such as: diversiform colors and designs, splendid visual effect, simply operation, and low price, to promote its application in building decoration filed.

However, the wall-cloth has some defects, such as: 1) unfriendly to the environment, because of the application of adhesive agent (which is necessary to paste the wall-cloth to the building surface), particularly organic solvent of the adhesive agent, comprising toxicants such as toluene, formaldehyde; 2) deficiency of tear-resistance, because of the uncontrollable and weak cohesive force between the wall surface and the adhesive agent, particularly, the environmentally friendly adhesive agent (rice glue, for example) which possesses high water absorptivity giving rise to go mouldy and break off the wall-cloth; 3) conspicuous gap between adjacent pieces of wall-clothe unites (which are cohesive to the wall, generally, in form of precut units) because of their thickness, particularly, in the presence of designs, making against its decorative performance and making difficulties for designs of patterns and colors; 4) deficiency of 3D performance, because most of the wall-cloths are planar presswork which is absence of 3D performance, or, has a limited viewing angle, even if, generating a 3D performance by optics technology.

SUMMARY OF THE INVENTION

The present invention provides a wall-cloth with a laminated core coated through infiltration and a method for preparing the same, or a method for decorating an object, to overcome some defects of the existing wall-cloths.

One aspect of the present invention provides a method for preparing a wall-cloth with a laminated core coated through infiltration on a surface of an object, or a method for decorating an object. Wherein, the object can be preferred a building or at least a part of the building, such as interior wall, outer wall, pillar, rooftop or floor, and so on; particularly preferred a wall of the building, more preferred interior wall. Or, the object can be preferred decorating material for building, such as decorating plate, ceramic tile and so on. Or, the object can be preferred sculpture, billboard, and furniture etc.

The method for preparing a wall-cloth with a laminated core coated through infiltration on a surface of an object, or a method for decorating an object of the invention comprises steps as follows, when a prime coating layer on the surface of the object lost its plasticity, a fiber sheet is covered on a surface of the prime coating layer; wherein, the fiber sheet possesses a network structure formed by fiber or fibers;
a second coating layer is coated on the surface of the fiber sheet; and the second coating layer is exerted pressure to promote coating material of the second coating layer moisten the fiber or fibers and permeate into the meshes of the network structure; therefore, a laminated core layer is formed;
operating a solidification process for the laminated core layer to form the wall-cloth with a laminated core coated through infiltration;

wherein, the second coating layer is transparent or semi-transparent.

The prime coating layer can be existed on the surface of the object, or can be, preferred, covered on the surface of the object just before covering the fiber sheet by operator on site.

Preferably, one surface of the fiber sheet is adhered to the surface of the prime coating layer, and more preferably, whole of the surface or a part/parts of the surface of the fiber sheet is adhered to the surface of the prime coating layer.

Preferably, when the prime coating layer on the surface of the object lost its plasticity, topside of the fiber sheet is adhered to the surface of the prime coating layer; and then the second coating layer is coated.

Preferably, the fiber sheet, more preferably, the topside of the fiber sheet, is adhered to the surface of the prime coating layer by pressure-sensitive adhesive agent, such as pressure-sensitive adhesive agent with a covered paster.

More preferably, while the second coating layer is coated, the paster is removed if the fiber sheet can retains its position on the surface of the prime coating layer.

Preferably, the method for preparing a wall-cloth with a laminated core coated through infiltration on a surface of an object, or a method for decorating an object of the invention comprises steps as follows, when a prime coating layer on the surface of the object lost its plasticity, a fiber sheet is covered on a surface of the prime coating layer by pressure-sensitive adhesive agent, such as pressure-sensitive adhesive agent with a covered paster; wherein, the fiber sheet possesses a network structure formed by fiber or fibers;

a second coating layer is coated on the surface of the fiber sheet; and the second coating layer is exerted pressure to promote coating material of the second coating layer moisten the fiber or fibers and permeate into the meshes of the network structure, more preferably, to contact with the prime coating layer; therefore, a laminated core layer is formed; wherein, while the second coating layer is coated, the paster is removed if at least a part of the fiber sheet can retains its position on the surface of the prime coating layer;

operating a solidification process for the laminated core layer to form the wall-cloth with a laminated core coated through infiltration;

wherein, the second coating layer is transparent or semi-transparent.

Preferably, the pressure-sensitive adhesive agent with a covered paster is on topside of the fiber sheet, i.e., the topside is adhered to the surface of the prime coating layer by pressure-sensitive adhesive agent.

Preferably, the method for preparing a wall-cloth with a laminated core coated through infiltration on a surface of an object, or a method for decorating an object of the invention comprises steps as follows, when a prime coating layer on the surface of the object lost its plasticity, a first coating layer is covered on the surface of the prime coating layer;

when the first coating layer retains its plasticity, a fiber sheet is covered on a surface of the first coating layer; wherein, the fiber sheet possesses a network structure formed by fiber or fibers; coating material of the first coating layer moisten the fiber or fibers and permeate into the meshes of the network structure;

a second coating layer is coated on the surface of the fiber sheet; and the second coating layer is exerted pressure to promote coating material of the second coating layer moisten the fiber or fibers and permeate into the meshes of the network structure, more preferably, to contact with the first coating layer; therefore, a laminated core layer is formed;

operating a solidification process for the laminated core layer to form the wall-cloth with a laminated core coated through infiltration;

wherein, the first coating layer and the second coating layer is transparent or semi-transparent.

Preferably, the fiber sheet can include one fiber sheet unit or more fiber sheet units. More preferably, the fiber sheet includes fiber sheet units adjacent one by one. More preferably, there can be overlap region between adjacent fiber sheet units.

Preferably, the first coating layer or fiber sheet can be covered when the prime coating layer has been dried.

Preferably, during the solidification process, the coating material of the second coating layer on a surface of the mesh will move into the mesh generating a deeper dent or deeper dents, while, the coating material of the second coating layer on a surface of the fiber of fibers will be restrict by the fiber of fibers generating no dent or a shallower dent or shallower dents, to form a texture or textures.

Preferably, before the solidification process of the second coating layer, the second coating layer can be flattened; and a texture will be formed in the second coating layer, because of different dent between the coating material on the surface of the mesh and the coating material on a surface of the fiber of fibers.

Moreover, the coating material of the first coating layer can move into the mesh or retains its position, during the solidification process.

Preferably, when the fiber sheet is covered on the first coating layer, the fiber sheet is pressed to embed at least a part of the fiber sheet into the first coating layer.

Preferably, the coating material of the second coating layer permeates into the meshes of the network structure and contact with the coating material of the first coating layer permeating into the meshes. More preferably, the first coating layer and the second coating layer are pressed again to obtain a tighter combination between the first coating layer and the second coating layer.

Preferably, the prime coating layer, and/or the first coating layer and/or the second coating layer, separately, can be just one layer or more layers. More preferably, the more layers can be same or different.

Preferably, the prime coating layer, and/or the first coating layer and/or the second coating layer, separately, do not contain any putty layer. Or, preferably, the prime coating layer contains putty layer and a second primer coating layer covering on the surface of the putty layer.

Preferably, the method of the invention comprises steps as follows, a prime coating layer is coated on the surface of the object;

when the prime coating layer lost its plasticity, a first adhesive agent is coated on the surface of the prime coating layer;

when the first adhesive agent retains its plasticity, a fiber sheet is covered on a surface of the first adhesive agent; the first adhesive agent moistens the fiber or fibers, or the fiber sheet is exerted pressure to promote the first adhesive agent moistens the fiber or fibers, and the first adhesive agent permeates into the meshes of the network structure;

a second adhesive agent is coated on the surface of the fiber sheet; and the second coating layer is exerted pressure to promote coating material of the second coating layer moisten the fiber or fibers and permeate into the meshes of the network structure; therefore, a laminated core layer is formed;

operating a solidification process for the laminated core layer; wherein during the solidification process, the second adhesive agent on a surface of the mesh will move into the mesh generating a deeper dent or deeper dents, while, the second adhesive agent on a surface of the fiber of fibers will be restrict by the fiber of fibers generating no dent or a shallower dent or shallower dents, to form a texture or textures.

Preferably, the method of the invention comprises steps as follows, a prime coating layer is coated on the surface of the object;

the when prime coating layer lost its plasticity, an adhesive agent is coated on the surface of the prime coating layer;

when the adhesive agent retains its plasticity, a fiber sheet is covered on a surface of the adhesive agent; the adhesive agent moistens the fiber or fibers, or the adhesive agent is exerted pressure to promote the adhesive agent moistens the fiber or fibers, and the adhesive agent permeates into the meshes of the network structure;

an inorganic coating is coated on the surface of the fiber sheet; and the inorganic coating is exerted pressure to promote coating material of the inorganic coating moisten the fiber or fibers and permeate into the meshes of the network structure; therefore, a laminated core layer is formed;

operating a solidification process for the laminated core layer; wherein during the solidification process, the inorganic coating on a surface of the mesh will move into the mesh generating a deeper dent or deeper dents, while, the inorganic coating on a surface of the fiber of fibers will be restrict by the fiber of fibers generating no dent or a shallower dent or shallower dents, to form a texture or textures.

Preferably, the method of the invention comprises steps as follows, a prime coating layer is coated on the surface of the object;

when the prime coating layer lost its plasticity, an first inorganic coating is coated on the surface of the prime coating layer;

when the first inorganic coating retains its plasticity, a fiber sheet is covered on a surface of the first inorganic coating; the first inorganic coating moistens the fiber or fibers, or the first inorganic coating is exerted pressure to promote the first inorganic coating moistens the fiber or fibers, and the first inorganic coating permeates into the meshes of the network structure;

an second inorganic coating is coated on the surface of the fiber sheet; and the second inorganic coating is exerted pressure to promote coating material of the second inorganic coating moisten the fiber or fibers and permeate into the meshes of the network structure; therefore, a laminated core layer is formed;

operating a solidification process for the laminated core layer; wherein during the solidification process, the second inorganic coating on a surface of the mesh will move into the mesh generating a deeper dent or deeper dents, while, the second inorganic coating on a surface of the fiber of fibers will be restrict by the fiber of fibers generating no dent or a shallower dent or shallower dents, to form a texture or textures.

The second aspect of the present invention provides a wall-cloth with a laminated core coated through infiltration, comprising a prime coating layer, a laminated core complex covered on the prime coating layer; wherein the laminated core complex comprises a second coating layer which can be transparent or semi-transparent and a fiber sheet encapsulated in the second coating layer; and wherein, the fiber sheet possesses a network structure formed by fiber or fibers, and the second coating layer permeates into the meshes of the network structure.

The present invention provides another wall-cloth with a laminated core coated through infiltration, comprising a prime coating layer, a laminated core complex covered on the prime coating layer; wherein the laminated core complex comprises a first coating layer and a second coating layer either of which can be transparent or semi-transparent and a fiber sheet encapsulated between the first coating layer and the second coating layer; and wherein, the fiber sheet possesses a network structure formed by continuous fiber or fibers, and at least one of the first coating layer and the second coating layer permeates into the meshes of the network structure.

Preferably, the second coating layer on a surface of the mesh will move into the mesh generating a deeper dent or deeper dents, while, the second coating layer on a surface of the fiber of fibers will be restrict by the fiber of fibers generating no dent or a shallower dent or shallower dents, to form a texture or textures.

Preferably, the second coating layer contacts with, more preferably combines to, the first coating layer in the meshes of the network structure. Or preferably, the second coating layer does not contact with the first coating layer in the meshes of the network structure, i.e., a gap is formed between the first coating layer and the second coating layer.

Preferably, the prime coating layer can be colored layer. More preferably, the first coating layer or the second coating layer, separately, can be colored layer or colorless layer. The color of the first coating layer or the second coating layer can be same with or different from the color of the prime coating layer.

Preferably, the prime coating layer can be functional coating layer to provide or advance functions of the object, preferably the wall-cloth, including one or more selected from a group comprising, for example, water proofing, fire proofing, electric conduction, antibiosis, heat preservation, sound insulation, heat storage.

Preferably, the second coating layer can be functional coating layer or covered by a functional coating layer. The function of the functional coating layer can be one or more selected from a group comprising, for example, corrosion resistance, scratch resistance, abrasion resistance, water proofing, fire proofing, electric conduction, antibiosis, heat preservation, sound insulation, heat storage.

Preferably, at least one of the prime coating layer, the first coating layer (if present), the second coating layer and the fiber sheet can be supported by at least a substance of bacterial inhibitor and/or bactericide; or supported by the substance which releases the substance of bacterial inhibitor and/or bactericide.

Preferably, the fiber sheet can be supported by at least a substance of bacterial inhibitor and/or bactericide; or supported by the substance which releases the substance of bacterial inhibitor and/or bactericide. For example, the fiber sheet can be supported by Ag+ or at least a substance which releases Ag+ in presence of water or atmosphere.

The skilled in the art can understand that the substance can be supported by a spinning process from a spinning solvent containing the substance. More preferably, the spinning process can be nonwoven process or typical woven process.

Preferably, at least one of the prime coating layer, the first coating layer (if present) and the second coating layer can be a water proofing layer or containing a water proofing layer.

More preferably, the water proofing layer is made from/of water proofing coating, or made by a water-proofing treatment of a coating layer.

Preferably, at least one of the prime coating layer, the first coating layer (if present) and the second coating layer can be a fire proofing layer or containing a fire proofing layer. And/or the fiber sheet is fire proofing sheet or non-combustible sheet.

More preferably, the fire proofing layer is made from/of fire proofing coating or made by a fire-proofing treatment of a coating layer. For example, the fire proofing coating layer can be silicate layer or a layer containing at least a fire retardant.

More preferably, the fiber sheet is made from/of fire proofing fiber/fibers or made by a fire-proofing treatment of a fiber sheet. For example, the fiber can be fire proofing fire or non-combustible, or can contain at least a fire retardant.

Wherein, preferably, the fire retardant can be at least one or more organic fire retardant selected from a group of halogenated flame retardant, N-P flame retardant, nitrogenated flame retardant, and/or at least one or more inorganic fire retardant selected from a group of antimony flame retardant, hydroxide and silicon flame retardant.

Preferably, at least one of the prime coating layer, the first coating layer (if present), the second coating layer and fiber sheet can possess a function of electromagnetic shielding.

More preferably, at least one of the prime coating layer and the second coating layer can possess a function of electromagnetic shielding.

More preferably, for the prime coating layer, the first coating layer (if present) and the second coating layer, the function of electromagnetic shielding can be achieved by adding at least an electronic conductive filler.

More preferably, for the fire sheet, the function of electromagnetic shielding can be achieved by loading at least an electronic conductive filler in its fiber or fibers.

Preferably, at least one of the prime coating layer, the first coating layer (if present), the second coating layer and fiber sheet can possess a function of magnetic absorption.

The skilled in the art shall understand that the function of magnetic absorption means other substance can be attached to a surface of the object by magnetic force. For example, the magnetic force can be generated to one or more selected from a group consisted of: metal such as Fe, Ni, Co, Gd or oxide of the metal, nitride of the metal, boride of the metal or alloy containing the metal (such as ferrite, NdFeB, samarium-cobalt magnetic alloy, AlNiCo, FeCrCo, $CrO_2$). Or the magnetic force can be generated by one or more selected from a group consisted of: metal such as Fe, Ni, Co, Gd or oxide of the metal, nitride of the metal, boride of the metal or alloy containing the metal (such as ferrite, NdFeB, samarium-cobalt magnetic alloy, AlNiCo, FeCrCo, $CrO_2$).

Preferably, the magnetic force can be achieved by adding magnetic substance or by employing magnetic substance. For example, the magnetic substance can be magnet or can be absorbed by the magnet. More preferably, the magnet can be one or more selected from a group consisted of samarium-cobalt magnetic alloy, NdFeB magnet, ferrite, AlNiCo magnet, FeCrCo magnet.

Preferably, the second coating layer contains or is covered by one or two of abrasion resistant layer and scratch resistant layer.

Preferably, at least one of the prime coating layer, the first coating layer (if present), the second coating layer and fiber sheet can possess a function of thermal storage through phase transition.

Preferably, the second coating layer is an anti-graffiti layer.

Preferably, the prime coating layer is a thermal insulation layer.

Preferably, the prime coating layer contains sealing prime layer and colored prime layer covered on a surface of the sealing prime layer.

Preferably, the sealing prime layer is coated on the surface of the object; and when the sealing prime layer maintains or lost its plasticity, the colored prime layer is coated on the surface of the sealing prime layer; and when the colored prime layer lost its plasticity, the fiber sheet is covered on the surface of the colored prime layer.

More preferably, the prime layer does not contain putty. Or, more preferably, the prime layer contains putty layer and the sealing prime layer covered on the putty layer.

More preferably the sealing prime layer can be made from/of room temperature (−30° C. to 150° C.) sealing coating, and/or high-temperature (−60° C. to 1700° C.) sealing coating and/or fire-resistant sealing coating. More preferably, the sealing prime coating contains at least one film-forming agent selected from a group consisted of acrylic resin, organic silicon resin, epoxy resin, polyurethane and inorganic nano-adhesive agent.

Preferably, during the solidification process of the second coating layer, the coating material of the second coating layer on a surface of the mesh will move into the mesh generating a deeper dent or deeper dents, while, the coating material of the second coating layer on a surface of the fiber of fibers will be restrict by the fiber of fibers generating no dent or a shallower dent or shallower dents, to form a texture or textures.

Preferably, before the solidification process of the second coating layer, the second coating layer can be flattened; and a texture will be formed in the second coating layer, because of different dent between the coating material on the surface of the mesh and the coating material on a surface of the fiber of fibers.

Moreover, the coating material of the first coating layer can move into the mesh or retains its position, during the solidification process.

Preferably, when the fiber sheet is covered on the first coating layer, the fiber sheet is pressed to embed at least a part of the fiber sheet into the first coating layer.

Preferably, the coating material of the second coating layer permeates into the meshes of the network structure and contact with the coating material of the first coating layer permeating into the meshes. More preferably, the first coating layer and the second coating layer are pressed again to obtain a tighter combination between the first coating layer and the second coating layer.

Preferably, the prime coating layer, and/or the first coating layer and/or the second coating layer, separately, can contain just one layer or more layers. More preferably, the more layers can be same or different.

Preferably, the prime coating layer, and/or the first coating layer and/or the second coating layer, separately, do not contain any putty layer. Or, preferably, the prime coating layer contains putty layer and a second primer coating layer covering on the surface of the putty layer.

More preferably, the second coating layer is colored coating layer. More preferably, the first coating layer or the second coating layer is separately colored coating layer or colorless coating layer.

The color of the first coating layer or the second coating layer can be same with or different from the color of a second prime coating layer (if the prime coating layer contains more than one layer). However, the color of the first coating layer or the second coating layer can be different from the second prime coating layer Preferably, the prime coating layer or the first coating layer can contains just one layer or more layers of adhesive agent, and/or organic coating, and/or inorganic coating. Furthermore, the prime coating layer or the first coating layer can contain sealing prime coating layer and interface agent.

Preferably, the second coating layer can contain just one layer or more layers of adhesive agent, and/or organic coating, and/or inorganic coating. Furthermore, the second coating layer can contain finishing coating layer, corrosion resistant layer, scratch resistant layer, abrasion resistant layer, etc.

Preferably, the adhesive agent can be one or more selected from a group consisted of inorganic adhesive agent and organic adhesive agent, which film-forming agent can be one or more selected from a group consisted of, such as, cement, lime, epoxy resin, organic silicon, silicone sealant, polyamide, polyurethane resin, acrylic resin, melamine formaldehyde resin, polyester, polyacrylate, polyvinyl acetate.

More preferably, the film forming agent of the organic coating can be one or more selected from a group consisted of: tung oil, nitrocellulose, alkyd resin, epoxy resin, polyacrylate, polyurethane, polyvinyl acetate, emulsion paint, etc.

More preferably, the film forming agent of the inorganic coating can be one or more selected from a group consisted of: alkali metal silicate, colloidal silica, phosphate salt, polysiloxane, etc. The inorganic coating is preferably inorganic dry-powdered coating.

More preferably, the first coating layer or the second coating layer can separately contain at least one layer made from/of inorganic dry-powdered coating.

Preferably, the fiber sheet contains fibers and meshes surrounded by the fibers, wherein, the fibers or meshes can spread in 2D direction or in 3D direction. More preferably, the fibers or meshes spread in 3D direction. More preferably, the meshes spread in 3D direction. More preferably, the fiber sheet possesses a 3D interpenetrating network, i.e., the meshes spread and connect in 3D direction. More preferably, the fibers spread in 3D direction.

More preferably, the fibers contain fibers spreading in horizontal direction, fibers spreading in vertical direction and fibers spreading in tilting direction.

More preferably, for each fiber, there are two or three parts selected from a group of consisted: a part spreading in horizontal direction, a part spreading in vertical direction and a part spreading in tilting direction.

More preferably, for each fiber, there is one or more parts—selected from a group of consisted: parts spreading in horizontal direction, parts spreading in vertical direction and parts spreading in tilting direction—cross each other.

And/or, more preferably, for each fiber, there is one or more parts—selected from a group of consisted: parts spreading in horizontal direction, parts spreading in vertical direction and parts spreading in tilting direction—cross one or more parts—selected from a group of consisted: parts spreading in horizontal direction, parts spreading in vertical direction and parts spreading in tilting direction—of other fiber or fibers.

More preferably, the meshes contain meshes spreading in horizontal direction, meshes spreading in vertical direction and meshes spreading in tilting direction.

More preferably, for each mesh, there are two or three parts selected from a group of consisted: parts spreading in horizontal direction, parts spreading in vertical direction and parts spreading in tilting direction.

More preferably, for each mesh, there is one or more parts—selected from a group of consisted: parts spreading in horizontal direction, parts spreading in vertical direction and parts spreading in tilting direction—connect to one or more parts—selected from a group of consisted: parts spreading in horizontal direction, parts spreading in vertical direction and parts spreading in tilting direction—of other mesh or meshes.

The skilled in the art shall understand that the term "tilting direction" means there is a nonzero angle between the direction and horizontal direction or vertical direction. The skilled in the art shall understand that the "horizontal direction" is in a horizontal plane and the "vertical direction" is in a vertical plane. Therefore, the "horizontal direction", the "vertical direction" and the "tilting direction" are not in the same plane.

However, the parts spreading in horizontal plane can be in a same horizontal plane or in different horizontal planes; the parts spreading in vertical plane can be in a same vertical plane or in different vertical planes; the parts spreading in tilting plane can be in a same tilting plane or in different tilting planes.

Preferably, the fiber or fibers spread in 2D direction, i.e., the fiber or fibers are in a same plane. And the meshes surrounded by the fiber or fibers distribute in 2D direction. More preferably, at least 60%, more preferably at least 80%, more preferably 100% of the meshes penetrate the fiber sheet. More preferably, the meshes distribute randomly in one plane or in different planes.

Preferably, the fiber or fibers distribute in different layers, wherein, the fibers in a same layer surround first meshes, and fibers in different layers cross each other to surround second meshes. A part of the first meshes and a part of the second meshes connect to each other to form the 3D interpenetrating network.

Preferably, the fiber in each layer can be form a 2D network by crossing longitude lines and latitude lines, and/or by bending a fiber or fibers.

More preferably, at least a part of the fibers interweave in at least two layers.

More preferably, fibers in different layers cross each other to form meshes spreading in different directions. For example, across points of the fibers in one layer or at least some layers locate in a mesh or meshes of other layer or layers. And/or, the direction of the fiber in one layer or at least some layers are different with the direction of the fibers in other layer or layers.

More preferably, the across point of the fibers can be linked together to form a connection point by melting and/or cohering, and more preferably, by melting.

More preferably, the percent of the connection points is 1% to 100%.

Wherein, the percent of the connection point means the ratio of the connection points in all the across points.

More preferably, the fiber sheet can be made from/of material or materials such as metal, plastic, rubber, fiber, and more preferably, of fiber. Wherein, the fiber can be one or more selected from a group consisted of organic fiber and inorganic fiber, such as one or more selected from a group consisted of: synthetic fiber, nature fiber (including modified nature fiber), regenerated fiber obtained from nature fiber, metal fiber, alloy fiber.

More preferably, the fiber can be one or more selected from a group consisted of synthetic fibers such as: polyamide (such as nylon-6, nylon-66), polyimide (such as P84 fiber), polypropylene, PTFE, polyester (such as PET, PBT), aramid fiber (such as poly(terephthaloyl-p-phenylene diamine), poly(isophthaloyl metaphenylene diamine), for example, Kevlar, Nomex from Dupont company; Twaron, Technora from Teijin company, Taparan from Taihe New-materal company), Polyphenylene Sulfide. However, the fiber can be glass fiber.

More preferably, the fiber is treated by a dipping process to advance performance of inflexibility and deformation resistance.

Preferably, the fiber has cross-sections with one or more regular and/or irregular shapes, for example, selected from a group consisted of: circle, semi-circle, ellipse, polygon (such as triangle, quadrilateral, pentagon, hexagon), pentagram, cashew nut shape, wavy shape, dumbbell shape, and more preferably, selected from a group consisted of: circle and ellipse.

Preferably, the fiber sheet can be made by one or more methods selected from a group consisted of: textile process (including nonwoven process, such as non-woven fabric technology), pouring process, mould pressing process and 3D printing process. More preferably, the fiber sheet can be made by nonwoven process, such as non-woven fabric technology, electrostatic spinning, etc. More preferably, a method for making the fiber sheet comprises the steps: spinning melt material to form a fiber or fibers, the fiber or fibers are stack up to form a multi-layer, and then pressing the multi-layer to connect fibers in a same layer or in different layers.

Preferably, the fiber of the fiber sheet has a diameter of 1 μm-5000 μm, more preferably 1 μm to 1000 μm, more preferably 1 μm to 100 μm, more preferably 1 μm to 50 μm, more preferably 5 μm to 50 μm, more preferably 5 μm to 40 μm.

Preferably, the fiber sheet has a thickness of 0.1 mm-10 mm, more preferably 0.1 mm-5 mm, more preferably 0.1 to 1 mm, more preferably 0.1 to 0.5 mm, more preferably 0.2 to 0.4 mm, such as 0.25 mm, 0.28 mm, 0.3 mm, 0.33 mm, 0.35 mm, 0.37 mm.

Preferably, a limited shape of the mesh is unnecessary, and the shape can be made according to the required texture. Wherein, the meshes can be evenly distributed. However, the meshes can have different distributed densities in different area of the fiber sheet.

Preferably, the mesh of the fiber sheet has an aperture of 0.1 mm to 10 mm, more preferably 0.1 mm to 5 mm, more preferably 0.1 mm to 3 mm, more preferably 0.1 mm to 1 mm.

Preferably, the fiber sheet has a density of 10 to 300 $g/m^2$, more preferably 15 to 200 $g/m^2$, more preferably 20 to 150 $g/m^2$, more preferably 20 to 100 $g/m^2$, more preferably 20-50 $g/m^2$.

Preferably, the fiber sheet can possess at least a pattern, wherein, the pattern is made by different structures in the fiber sheet. And the pattern can be made by concavity, bulge or die-cutting to form a pattern penetrating the fiber sheet.

More preferably, the pattern can possess color or colors, wherein, the color or colors of the pattern can be same with or different from the color of the prime coating layer, or the color or colors of at least part of the pattern can be same with or different from the color of the prime coating layer.

Preferably, the pattern can be made of meshes which are denser or sparser than meshes in other area of the fiber sheet. Of course, the pattern can be made of just one mesh. Preferably, the pattern can be made by an embossing process.

Preferably, the pattern can be made by one or more methods selected from a group consisted of: textile process (including nonwoven process, such as non-woven fabric technology), pouring process, mould pressing process, hot imprint bonding process, and plugging some meshes. Preferably, the pattern can be made by one or more methods selected from a group consisted of: nonwoven process, spray-paint plastic ornament, pasting a film, hot imprint bonding process, plugging some meshes and mould pressing process.

Preferably, the pattern can be made by nonwoven process, for example, the pattern is made during the spinning process to form the 3D Interpenetrating network, or is made by heat pressing after forming the 3D Interpenetrating network.

Preferably, the fiber sheet may have undergone or can undergo a surface treatment. Of course, the fiber sheet may have not undergone a surface treatment. Wherein, the surface treatment can be applied on just one surface or both surface of the fiber sheet.

Preferably, the surface treatment can be one or more selected form a group consisted of a) to g):
a) flattening just one surface or both surfaces, reserving at least a part of openings connecting the meshes;
b) coating material on the surface to change a function or functions of the fiber, preferably, materials with different water absorption are coated; more preferably, the function or functions (such as water absorption) gradual change from one end to the other of the fiber sheet;
c) dyeing the fiber sheet, wherein, just one color or more colors can be dyed; and preferably, the more colors gradual change from one end to the other of the fiber sheet;
d) pasting a film or films on just one surface or both surfaces, reserving at least a part of openings connecting the meshes;
e) mould pressing the fiber sheet to form indented pattern on the surface of the fiber sheet; preferably, an embossing, slop padding or hole rolling process can be used;
f) die cutting the fiber sheet to form a pattern penetrating the fiber sheet;
g) modification, for example, by dipping process, to advance inflexibility and deformation resistance.

Preferably, the thickness of the fiber sheet can be greater than, less than or equal to a sum of a thickness of the first coating layer and a thickness of the second coating layer; preferably, can be greater than or equal to the sum of the thickness of the first coating layer and the thickness of the second coating layer; more preferably, can be greater than the sum of the thickness of the first coating layer and the thickness of the second coating layer.

Preferably, coating or material of any layer mentioned-above can be selected form available coating or material, so long as, preferably, the coating or material shall possess a diameter meeting a demand for permeating into the 3D interpenetration network of the fiber sheet and filling into the meshes.

Preferably, the first coating layer or the second coating layer, separately, possesses a particle diameter of $\leq 50$ μm, more preferably $\leq 30$ μm, more preferably $\leq 20$ μm, more preferably $\leq 10$ μm.

Preferably, the first coating layer or the second coating layer, separately, possesses a particle diameter of $\leq 1/5$, more preferably $\leq 1/10$, more preferably $\leq 1/100$ of a mean pore size of meshes of the fiber sheet; meanwhile, more preferably possesses a particle diameter of ≥1/1000 of a mean pore size of meshes of the fiber sheet.

Preferably, the first coating layer or the second coating layer, separately, contains inorganic cementing material and/ or organic cementing material; more preferably, contains at least inorganic cementing material; more preferably, contains optional one or more selected form a group consisted of: filler, additive, pigment and solvent.

Preferably, the inorganic cementing material can be one or more selected form a group consisted of: cement, lime, alkali metal silicate, phosphate salt, colloidal silica, polysiloxane; and more preferably, can be one or more selected form a group consisted of: cement, lime, alkali metal silicate.

Preferably, the organic cementing material can be one or more selected form a group consisted of: tung oil, linseed oil, shella, epoxy resin, alkyd resin, amino-alkyd resin, polyurethane, chlorinated rubber, ethylene perchloride coating, polyvinyl acetate emulsion, styrene-acrylic emulsion, vinyl acetate-acrylic emulsion, acrylic emulsion.

Preferably, the filler can be one or more selected form a group consisted of: stone powder, fiber and metal powder; more preferably, can be one or more selected form a group consisted of: graphite, talcum powder, glass flour, diatomite, kaolin, carbon black, alumina, mica, wood powder, asbestos powder, argil, calcium carbonate, flyash.

Preferably, the additive can be any available additive to modifying the form and/or looks (such as, color) of the coating, for example, can be one or more selected form a group consisted of: direr, antisettling agent, inhibitor, antimildew agent, plasticizer, polymer rubber powder, cellulose ether, defoamer, thickener, waterproofing agent, and leveling agent.

Preferably, the additive can be one or more selected form a group consisted of: water and organic solvent (such as toluene, xylene, cyclohexanone, formaldehyde), and more preferably, the solvent is water.

Preferably, the time for solidifying (losing plasticity of) the first coating layer or the second coating layer separately is not limited by the present invention do not limited, so long as the time can meet a demand for the fiber sheet being penetrated and the meshes being filled. In general, the time for solidifying the first coating layer or the second coating layer, after being coated, separately is preferably no exceeding 24 hours, more preferably no exceeding 12 hours, more preferably no exceeding 2 hours.

Preferably, the time for solidifying the first coating layer or the second coating layer separately is exceeding 1 min later, more preferably 2 min later, more preferably 5 min later, more preferably 10 min later, more preferably 15 min later, more preferably 20 min later, more preferably 30 min later, after being coated.

Preferably, the first coating layer or the second coating layer can be solidifying separately by one or more methods selected from a group consisted of: solvent evaporation (such as dehydration), light curing, air curing, and chemical reaction curing, more preferably, by dehydration and/or chemical reaction curing.

Preferably, the pressure can be exerted by one or more methods selected from a group consisted of: rolling depression, scraping depression. More preferably, the rolling depression and scraping depression cannot form any texture.

Preferably, the first coating layer or the second coating layer can be coated, separately, by any known coating method or methods, such as spray coating, knife-coating, roller coating and brush coating.

The method for making wall-cloth with a laminated core coated through infiltration obtain benefits as follows:

1) the wall-cloth with a laminated core coated through infiltration is coated on the surface of a object to obtain a competent adhesive force between the coating and the surface; meanwhile, no conspicuous gap generated at a position between adjacent units; it is difficult to tear down the coating even if from the position of the contact point;
2) the coating permeates into the meshes of the fiber sheet to obtain engaging and adhering function between the coating and the fiber of the fiber sheet, particularly in the presence of 3D interpenetrating network, wherein, the coating, also in 3D directions, moistens fibers, permeates and fills in 3D directions into meshes distribute with connections of the meshes; therefore, there is an inseparable combination between the coating and the fiber sheet, and there is a greater tear-resistance than known wall-cloth which is applied generally to form textures;
3) a laminated core structure is obtained with a fiber sheet core coated in coatings, and enhanced thickness of the fiber is obtained by coating the second coating layer on the fiber sheet, and the texture of the fiber sheet can be emerged when the second coating layer moves into the mesh during the solidifying process; therefore, the texture is controlled, because the fiber sheet can be produced according to a standard and large scale method to obtain identical texture; furthermore, the texture of the fiber sheet can be diversified to obtain various textures on the wall-clothe;
4) a laminated core structure is obtained to the enhance tear-resistance performance of the wall-cloth, comparing with the know wall-paper and wall-cloth used to obtain textures; and comparing with the coating containing glass fiber cloth, the present invention obtains reduced weight, meanwhile, similar tear-resistance performance;
5) the method of the present invention can make various textures on the surface of the object, and no conspicuous/visible gap is generated at the position between adjacent units; therefore, the method of the present invention obtains continuous and various textures and pattern, and the obtained wall-clothe is felt comfortable; meanwhile, combination of color/pattern of the fiber sheet with the color/pattern of the prime coating layer can increase varieties of the color expression of a decorative surface;
6) the wall-cloth made by the present invention has excellence breathability and great gas transmission.

BRIEF DESCRIPTION OF THE DRAWINGS

FIG. 1A shows the structure of the wall-cloth with a laminated core coated through infiltration on a surface of a wall;

FIG. 1B shows the texture of the surface of the wall in FIG. 1A;

FIG. 2A to 2C show different connection points of the fiber sheet;

FIG. 3 shows a sectional view of the fiber sheet with 3D interpenetrated network structure;

EMBODIMENTS

Example 1

Figure 4A:
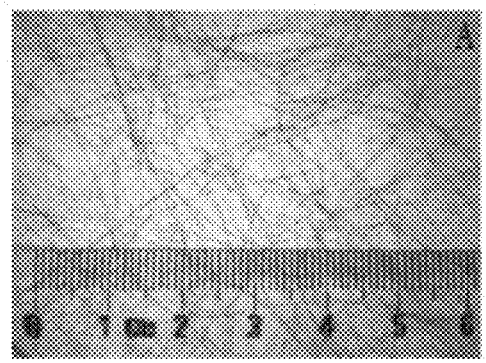
FIG. 4A to 4B are photos showing sectional views of the fiber sheet.

As shown in FIG. 1A, the wall-cloth with a laminated core coated through infiltration of the present invention comprises a prime coating layer 11, a laminated core complex covered on the prime coating layer; wherein the laminated core complex comprises a first coating layer 20 and a second coating layer 40 either of which can be transparent or semi-transparent and a fiber sheet 30 encapsulated between the first coating layer 20 and the second coating layer 40.

In this example, the fiber sheet 30 possesses a 3D interpenetrating network formed by fibers, including fibers spreading in horizontal direction, fibers spreading in vertical direction and fibers spreading in tilting direction. Some structures of the fiber sheet are shown in FIG. 2A to 2C. As shown in FIG. 2A to 2C, in a same plane, fibers spreading in horizontal direction 5 crosses fibers spreading in vertical direction 4 and fibers spreading in tilting direction 3, to surround meshes 2. The across point of the fibers can be linked together to form a connection point 1 by melting and/or cohering, and more preferably, in this example, by melting.

The percent of the connection points in all cross points is 1% to 100%, i.e., all or a part of the cross points is linked to form the connection points. As shown in FIG. 2A, the cross points of fibers spreading in horizontal direction 5 and fibers spreading in vertical direction 4 do not form the connection points. The cross points of fibers spreading in horizontal direction 5 fibers spreading in tilting direction 3, and the cross point of fibers spreading in vertical direction 4 and fibers spreading in tilting direction 3 form the connection points 1.

The skilled in the art shall understand that the fiber sheet 30 possesses a 3D interpenetrating network, i.e., the fibers distribute in different planes. In fact, the fibers contain fibers spreading in horizontal direction, fibers spreading in vertical direction and fibers spreading in tilting direction. The fibers spreading in horizontal direction, fibers spreading in vertical direction and fibers spreading in tilting direction across each other to form some connection points.

Meanwhile, the fiber has a great length, therefore, for each fiber, there are two or three parts selected from a group of consisted: a part spreading in horizontal direction, a part spreading in vertical direction and a part spreading in tilting direction. The parts may distribute in different horizontal planes, vertical planes and tilting planes.

As shown in FIG. 3, a horizontal mesh 22 is formed by the upper horizontal fibers 31 in a horizontal plane and lower horizontal fibers 32 in a horizontal plane; a vertical mesh 21 is formed by the upper horizontal fibers 31 in a horizontal plane and vertical fibers 33 in a vertical plane. The horizontal mesh 22 connects to the vertical mesh 21. Similarly, a tilting mesh 23 is formed by upper horizontal fibers 31 and tilting fibers or by vertical fibers 33 and tilting fibers. The tilting mesh 23 connects to the horizontal mesh 22 and/or connects to the vertical mesh 21

The upper horizontal fibers 31 and lower horizontal fibers 32 can belong to a same fiber or different fibers.

Figure 6A:
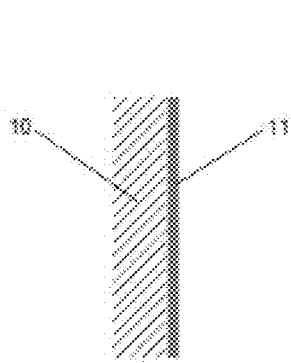
FIG. 6A to 6C show the process for making the wall-cloth with a laminated core coated through infiltration.

As shown in FIG. 6, the method for preparing a wall-cloth with a laminated core coated through infiltration of the invention comprises steps as follows:

As shown in FIG. 6A, a colored prime coating layer 11 is coated on the surface of the wall 10.

When the colored prime coating layer 11 lost its plasticity, a first inorganic coating (such as inorganic dry-powder coating) is coated on the surface of the prime coating layer, to form a transparent or semi-transparent first coating layer. The first coating layer shall cover the surface of the colored prime coating layer 11; however, it is unnecessary to flat the first coating layer.

Figure 6B:
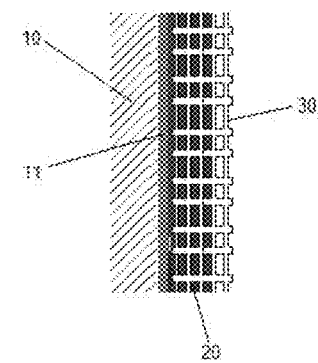

As shown in FIG. 6B, when the first coating layer retains its plasticity, a fiber sheet 30 is covered on a surface of the first coating layer. The first coating layer moistens the fiber or fibers, or the fiber sheet is exerted pressure to promote the first inorganic coating layer moistens the fiber or fibers, and the first adhesive agent permeates into the meshes of the network structure. During this step, the fiber sheet 30 can or cannot contact with the surface of the colored prime coating layer 11. The first inorganic coating can penetrate the mesh and exude from the mesh of the fiber sheet 30, however, this is unnecessary.

Figure 6C:
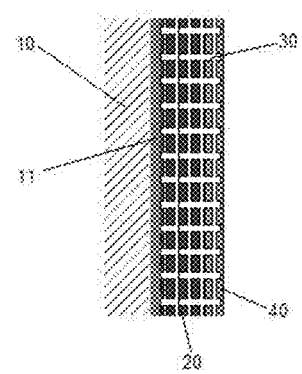

As shown in FIG. 6C, a second inorganic coating (such as inorganic dry-powder coating) is coated to form a transparent or semi-transparent second coating layer. The second inorganic coating is exerted pressure to promote coating material of the second coating layer moisten the fiber or fibers and permeate into the meshes of the network structure. Therefore, a laminated core layer is formed.

Because of the pressure, the first inorganic coating and the second inorganic coating contact in the meshes and combines together, as shown in FIG. 6C.

Operating a solidification process for the laminated core layer; wherein during the solidification process, the second inorganic coating on a surface of the mesh will move into the mesh generating a deeper dent or deeper dents, while, the second inorganic coating on a surface of the fiber of fibers will be restrict by the fiber of fibers generating no dent or a shallower dent or shallower dents, to form a texture or textures, as shown in FIG. 1A. Furthermore, during the solidification process, the first inorganic coating integrates with the second inorganic coating at the contacting position.

As shown in FIG. 1B, the surface of the fiber sheet 3 can be or not flat plane.

As shown in FIG. 1B, the first part of the fiber 301 is lower than the second part of fiber 302. Of course, the surface can be flatted by some leveling technologies. During the solidification process, the surface of the first part of the fiber 301 generates a lower texture 501, and the second part of the fiber 302 generates a higher texture 502, and the second inorganic coating moves downwards in the mesh 2 to form a cupped texture 503. Therefore, a rough texture 50 is obtained. And the shape of the texture 50 is similar with the rough surface structure of the fiber sheet 30.

Figure 5A:
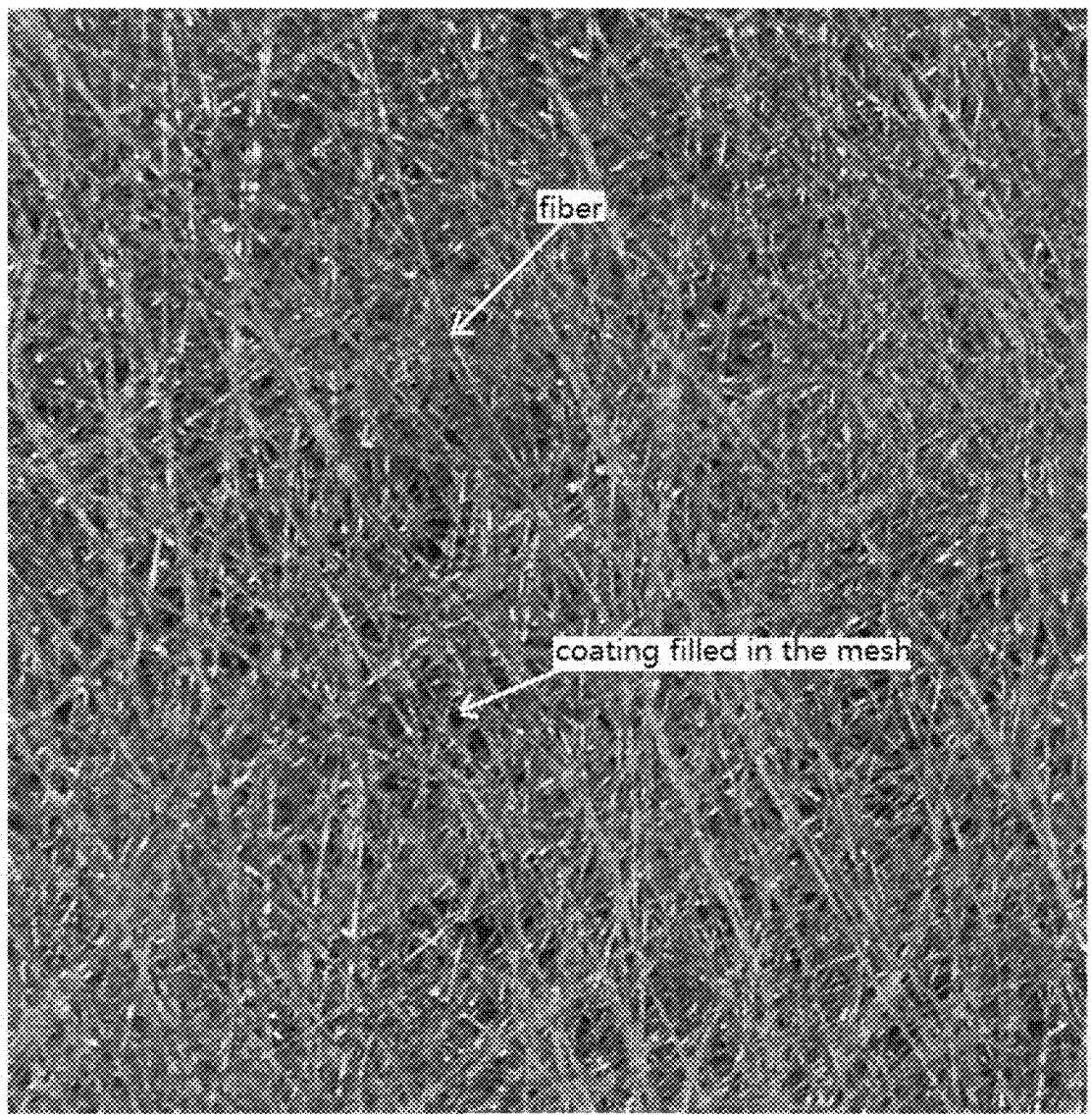
FIG. 5A to 5B are photos showing the fiber sheet filled by coating.
Figure 5B:
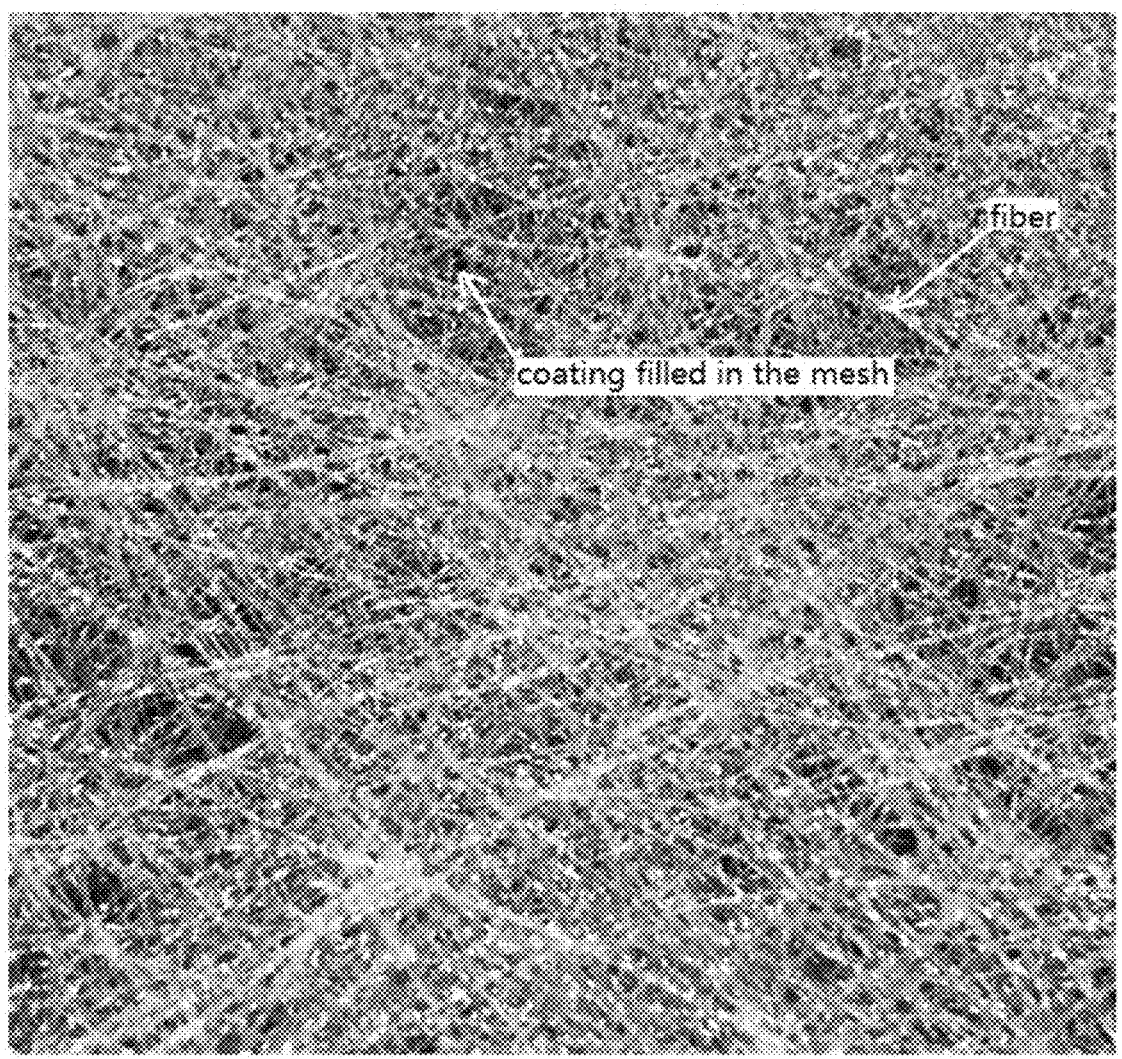

FIG. 5A to 5B shows the process of moistening the fiber and permeating into the meshes. In this Figures, shown by dark color is coating or coating layer filled into the meshes and the light color is fiber. The coating permeates and fills into the meshes of the 3D interpenetrating network of the fiber sheet 30, to obtain a competent adhesive force between the coating and the surface. The meshes distribute in 3D direction in the 3D interpenetrating network. And the coating, also in 3D directions, moistens fibers, permeates and fills into meshes distribute in 3D directions with connections of the meshes. Therefore, there is an inseparable combination between the coating and the fiber sheet 30, and a greater tear-resistance can be achieved.

As shown in FIG. 2B, the present invention is illustrated in case of polyethylene fibers. Parts of the fibers distribute in 3D direction of the fiber sheet 30, during a welding process, will melt to form a block 100 because of a heat pressing operation. Therefore, when the first inorganic coating and the second inorganic coating moves into the meshes, the competent adhesive force is enhanced.

As shown in FIG. 2C, in case of excessive heat pressing or melting, a casted fiber or adhesive when it is melt will fill into the meshes 2 or forms new meshes 200. The meshes 2 also connect to the new meshes 200. Therefore, a more complex filling structure of the coating will be formed to enhance the tear-resistance.

Figure 4B:
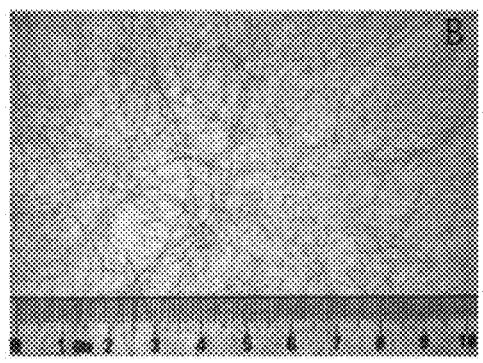

As shown in FIG. 4A to 4B, the fiber of the fiber sheet has a diameter of 1 μm-5000 μm, more preferably 1 μm to 1000 μm, more preferably 1 μm to 100 μm, more preferably 1 μm to 50 μm, more preferably 5 μm to 50 μm, more preferably 5 μm to 40 μm. The mesh of the fiber sheet has an aperture of 0.1 mm to 10 mm, more preferably 0.1 mm to 5 mm, more preferably 0.1 mm to 3 mm, more preferably 0.1 mm to 1 mm. The fiber sheet has a density of 10 to 300 g/m², more preferably 15 to 200 g/m², more preferably 20 to 150 g/m², more preferably 20 to 100 g/m², more preferably 20-50 g/m².

The fiber sheet has a thickness of 0.1 mm-10 mm, more preferably 0.1 mm-5 mm, more preferably 0.1 to 1 mm, more preferably 0.1 to 0.5 mm, more preferably 0.2 to 0.4 mm, such as 0.25 mm, 0.28 mm, 0.3 mm, 0.33 mm, 0.35 mm, 0.37 mm. In the present invention, the thickness of the fiber sheet 30 can be greater than or equal to the sum of the thickness of the first coating layer and the thickness of the second coating layer; more preferably, can be greater than the sum of the thickness of the first coating layer and the thickness of the second coating layer. However, the thickness of the second coating layer is preferably less than ½ of the thickness of the fiber sheet 30.

Figure 7:
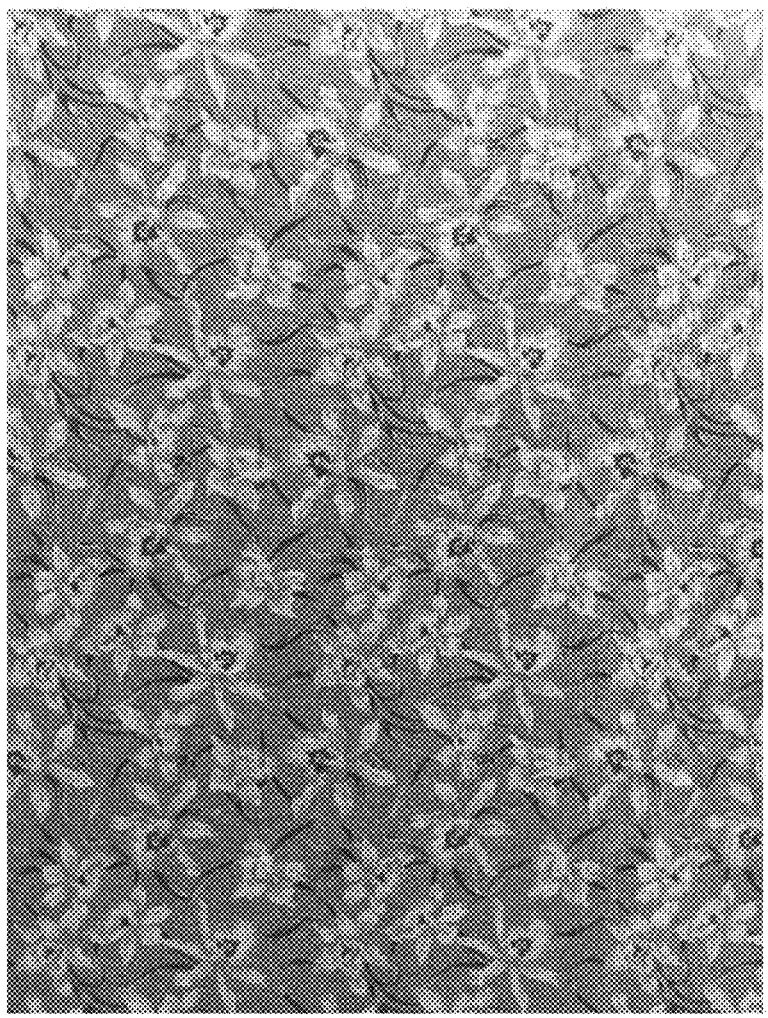
FIG. 7 is a photo of the wall-cloth product made by the present invention.

As shown in FIG. 7, the wall-cloth made in this example shows a 3D pattern, including: colored prime coating layer 11 as base layer, fiber sheet 30 with pattern to form a rilievo texture, and transparent or semi-transparent first coating layer 20 and second coating layer 40 forming finishing coating layer covering the rilievo texture. When the light shoots to the finishing coating layer, refraction and will be dispersion of the light occur. The color of the colored prime coating layer becomes softer and the color of the colored prime coating layer, together with the color of the fibers and color of the patter of the fiber sheet, generates stereo pattern decorating. For example, the color of the colored prime coating layer is blue, and the fiber sheet 30 contains colored flower pattern. Then a stereo flower pattern with blue background is generated. As shown in FIG. 7, the stereo flower pattern is very obvious and vivid. And obviously, the pattern is like to be suspended on the wall.

Meanwhile, during the solidifying process, the second coating layer 40 moves into the meshes, a texture related to the fiber sheet occurs on the surface of the second coating layer 40. As shown in FIG. 7, the fiber sheet swells from the second coating layer 40 to form tiny rough textures and obvious flosses on the surface of the second coating layer 40, i.e., generating flannelette tactility of flocking wall-cloth to modify tactility and overcome the cold decorative effect of the coating.

In this example, the film forming agent of the first inorganic coating and the second inorganic coating is alkali metal silicate. The filler, additive and pigment can be used. In all the components, the max particle diameter is of 50 μm, more preferably ≤30 μm, more preferably ≤20 μm, more preferably ≤10 μm. Meanwhile the max particle diameter is ≤⅕, more preferably ≤ 1/10, more preferably ≤ 1/100 of a mean pore size of meshes of the fiber sheet; meanwhile, more preferably possesses a particle diameter of 1/1000 of a mean pore size of meshes of the fiber sheet.

Example 2

The method for preparing a wall-cloth with a laminated core coated through infiltration of the invention comprises steps as follows:

A sealing prime coating layer is coated on the surface of the wall 10. When the sealing prime layer maintains or lost its plasticity, a colored prime layer 11 is coated on the surface of the sealing prime layer.

When the colored prime coating layer 11 lost its plasticity, a transparent or semi-transparent first inorganic coating (such as inorganic dry-powder coating) is coated on the surface of the prime coating layer, to form a transparent or semi-transparent first coating layer. The first coating layer shall cover the surface of the colored prime coating layer 11; however, it is unnecessary to flat the first coating layer.

As shown in FIG. 6B, when the first coating layer retains its plasticity, a fiber sheet 30 is covered on a surface of the first coating layer. The first coating layer moistens the fiber or fibers, or the fiber sheet is exerted pressure to promote the first inorganic coating layer moistens the fiber or fibers, and the first adhesive agent permeates into the meshes of the network structure.

As shown in FIG. 6C, a transparent or semi-transparent second inorganic coating (such as inorganic dry-powder coating) is coated to form a transparent or semi-transparent second coating layer. The second inorganic coating is exerted pressure to promote coating material of the second coating layer moisten the fiber or fibers and permeate into the meshes of the network structure. Therefore, a laminated core layer is formed.

Because of the pressure, the first inorganic coating and the second inorganic coating contact in the meshes and combines together, as shown in FIG. 6C.

Operating a solidification process for the laminated core layer; wherein during the solidification process, the second inorganic coating on a surface of the mesh will move into the mesh generating a deeper dent or deeper dents, while, the second inorganic coating on a surface of the fiber of fibers will be restrict by the fiber of fibers generating no dent or a shallower dent or shallower dents, to form a texture or textures.

Wherein, the fiber of the fiber sheet has a diameter of 20 μm. The mesh of the fiber sheet has an aperture of 0.5 mm. The fiber sheet 30 has a density of 50 g/m².

Wherein, the fiber sheet 30 has a thickness of 0.25 mm. The first coating layer has a thickness of 0.1 mm. The second coating layer has a thickness of 0.13 mm.

In this example, the sealing prime coating layer seals holes of the wall 10 avoiding water infiltrating into the wall. Therefore, alkalization of the wall 10 is avoided and exudation of the alkali to damage the wall-cloth also is avoided.

Example 3

The method for preparing a wall-cloth with a laminated core coated through infiltration of the invention comprises steps as follows:

A colored prime layer 11 is coated on the surface of the wall 10.

When the colored prime coating layer 11 lost its plasticity, a transparent or semi-transparent first organic coating (such as emulsion paint) is coated on the surface of the prime coating layer, to form a transparent or semi-transparent first coating layer 20.

A fiber sheet 30 is covered on a surface of the first coating layer 20. The first coating layer moistens the fiber or fibers, or the fiber sheet is exerted pressure to promote the first inorganic coating layer moistens the fiber or fibers, and the first adhesive agent permeates into the meshes of the network structure.

A transparent or semi-transparent second organic coating (such as emulsion paint) is coated to form a transparent or semi-transparent second coating layer. The second inorganic coating is exerted pressure to promote coating material of the second coating layer moisten the fiber or fibers and permeate into the meshes of the network structure. Therefore, a laminated core layer is formed.

Operating a solidification process for the laminated core layer; wherein during the solidification process, the second inorganic coating on a surface of the mesh will move into the mesh generating a deeper dent or deeper dents, while, the second inorganic coating on a surface of the fiber of fibers will be restrict by the fiber of fibers generating no dent or a shallower dent or shallower dents, to form a texture or textures.

Wherein, the fiber of the fiber sheet has a diameter of 30 μm. The mesh of the fiber sheet has an aperture of 1 mm. The fiber sheet 30 has a density of 100 g/m².

Wherein, the fiber sheet 30 has a thickness of 0.3 mm. The first coating layer has a thickness of 0.15 mm. The second coating layer has a thickness of 0.15 mm.

In this example, fiber of the fiber sheet 30 contains substance releasing Ag+.

The substance can be supported by the method of: the substance (such as silver nitrate) is added into spinning solution containing fiber material; during a spinning process, the substance is sprayed with fiber material; then evaporating solvent and the silver nitrate is supported into the fiber. The spinning can be electrostatic spinning, or nonwoven fabrics technology or normal textile process. After being supported, the Ag+ can be reduced into Ag. Ag+ supported in fibers, and the second coating layer covers the fibers. Therefore, the Ag+ is avoided to drop out and a long term sterilization effect is enhanced.

Example 4

The method for preparing a wall-cloth with a laminated core coated through infiltration of the invention comprises steps as follows:

When the colored prime coating layer 11 lost its plasticity, a transparent or semi-transparent first inorganic coating (such as inorganic dry-powder coating) is coated on the surface of the prime coating layer, to form a transparent or semi-transparent first coating layer. The first coating layer shall cover the surface of the colored prime coating layer 11; however, it is unnecessary to flat the first coating layer.

As shown in FIG. 6B, when the first coating layer retains its plasticity, a fiber sheet 30 is covered on a surface of the first coating layer. The first coating layer moistens the fiber or fibers, or the fiber sheet is exerted pressure to promote the first inorganic coating layer moistens the fiber or fibers, and the first adhesive agent permeates into the meshes of the network structure.

As shown in FIG. 6C, a transparent or semi-transparent anti graffiti inorganic coating is coated to form a transparent or semi-transparent anti graffiti coating layer. The anti graffiti inorganic coating is exerted pressure to promote coating material of the anti graffiti coating layer moisten the fiber or fibers and permeate into the meshes of the network structure. Therefore, a laminated core layer is formed.

Because of the pressure, the first inorganic coating and the anti graffiti coating contact in the meshes and combines together, as shown in FIG. 6C.

Operating a solidification process for the laminated core layer; wherein during the solidification process, the anti graffiti inorganic coating on a surface of the mesh will move into the mesh generating a deeper dent or deeper dents, while, the anti graffiti inorganic coating on a surface of the fiber of fibers will be restrict by the fiber of fibers generating no dent or a shallower dent or shallower dents, to form a texture or textures.

Example 5

The method for preparing a wall-cloth with a laminated core coated through infiltration of the invention comprises steps as follows:

A thermal insulation coating layer is coated on the surface of the wall 10 to form the first coating layer or the prime coating layer.

As shown in FIG. 6B, when the thermal insulation coating layer retains its plasticity, a fiber sheet 30 is covered on a surface of the thermal insulation coating layer. The fiber sheet 30 contains a pattern made by embossing.

A transparent or semi-transparent second inorganic coating, or emulsion paint, is coated. The second inorganic coating is exerted pressure to promote coating material of the second coating layer moisten the fiber or fibers and permeate into the meshes of the network structure. Therefore, a laminated core layer is formed;

Because of the pressure, the first inorganic coating and the anti graffiti coating contact in the meshes and combines together, as shown in FIG. 6C.

Operating a solidification process for the laminated core layer; wherein during the solidification process, the coating on a surface of the mesh will move into the mesh generating a deeper dent or deeper dents, while, the coating on a surface of the fiber of fibers will be restrict by the fiber of fibers generating no dent or a shallower dent or shallower dents, to form a texture or textures.

Example 6

In this example, the structure of the wall-cloth with a laminated core coated through infiltration includes: colored prime coating layer 11, a laminated core complex covered on the colored prime coating layer; wherein the laminated core complex comprises a first coating layer 20 and a second coating layer 40 either of which can be transparent or semi-transparent and a fiber sheet 30 encapsulated between the first coating layer 20 and the second coating layer 40. The second coating layer 40 is water-proofing coating layer.

The method for preparing the wall-cloth with a laminated core coated through infiltration of the invention comprises steps as follows:

A colored prime coating layer 11 is coated on the surface of the wall 10.

When the colored prime coating layer 11 lost its plasticity, a transparent or semi-transparent first inorganic coating (such as inorganic dry-powder coating) is coated on the surface of the prime coating layer, to form a transparent or semi-transparent first coating layer 20. The first coating layer shall cover the surface of the colored prime coating layer 11; however, it is unnecessary to flat the first coating layer.

As shown in FIG. 6B, when the first inorganic coating maintains its plasticity, a fiber sheet 30 is covered on a surface of the thermal insulation coating layer. The first inorganic coating layer moistens the fiber or fibers, or the fiber sheet is exerted pressure to promote the first inorganic coating layer moistens the fiber or fibers, and the first adhesive agent permeates into the meshes of the network structure. During this step, the fiber sheet 30 can or cannot contact with the surface of the colored prime coating layer 11. The first inorganic coating can penetrate the mesh and exude from the mesh of the fiber sheet 30, however, this is unnecessary.

A transparent or semi-transparent second inorganic coating, or emulsion paint, is coated. The second inorganic coating is exerted pressure to promote coating material of the second coating layer moisten the fiber or fibers and permeate into the meshes of the network structure. Therefore, a laminated core layer is formed;

As shown in FIG. 6C, a transparent or semi-transparent second inorganic coating (water proofing coating layer) is coated to obtain a transparent or semi-transparent second coating layer. The second inorganic coating is exerted pressure to promote coating material of the second coating layer moisten the fiber or fibers and permeate into the meshes of the network structure. Therefore, a laminated core layer is formed.

Because of the pressure, the first inorganic coating and the second coating contact in the meshes and combines together, as shown in FIG. 6C.

Operating a solidification process for the laminated core layer; wherein during the solidification process, the second inorganic coating on a surface of the mesh will move into the mesh generating a deeper dent or deeper dents, while, the second inorganic coating on a surface of the fiber of fibers will be restrict by the fiber of fibers generating no dent or a shallower dent or shallower dents, to form a texture or textures, as shown in FIG. 1A. Furthermore, during the solidification process, the first inorganic coating integrates with the second inorganic coating at the contacting position Example 7

In this example, the structure of the wall-cloth with a laminated core coated through infiltration includes: colored prime coating layer 11, a laminated core complex covered on the colored prime coating layer; wherein the laminated core complex comprises a first coating layer 20 and a second coating layer 40 either of which can be transparent or semi-transparent and a fiber sheet 30 encapsulated between the first coating layer 20 and the second coating layer 40. The second coating layer 40 is fire-proofing coating layer.

The method for preparing the wall-cloth with a laminated core coated through infiltration can be carried on according to the example 6.

Example 8

In this example, the structure of the wall-cloth with a laminated core coated through infiltration includes: colored prime coating layer 11, a laminated core complex covered on the colored prime coating layer; wherein the laminated core complex comprises a first coating layer 20 and a second coating layer 40 either of which can be transparent or semi-transparent and a fiber sheet 30 encapsulated between the first coating layer 20 and the second coating layer 40. The colored prime coating layer 10 contains electronic conductive filler to obtain electromagnetic shielding function.

The method for preparing the wall-cloth with a laminated core coated through infiltration can be carried on according to the example 6.

Example 9

In this example, the structure of the wall-cloth with a laminated core coated through infiltration includes: colored prime coating layer 11, a laminated core complex covered on the colored prime coating layer; wherein the laminated core complex comprises a first coating layer 20 and a second coating layer 40 either of which can be transparent or semi-transparent and a fiber sheet 30 encapsulated between the first coating layer 20 and the second coating layer 40. The second coating layer 40 contains magnetic powder.

The method for preparing the wall-cloth with a laminated core coated through infiltration can be carried on according to the example 6.

Furthermore, on the surface of the second coating layer 40, a anti-graffiti coating layer can be covered.

Example 10

In this example, the structure of the wall-cloth with a laminated core coated through infiltration includes: colored prime coating layer 11, a laminated core complex covered on the colored prime coating layer; wherein the laminated core complex comprises a first coating layer 20 and a second coating layer 40 either of which can be transparent or semi-transparent and a fiber sheet 30 encapsulated between the first coating layer 20 and the second coating layer 40.

The second coating layer 40 contains PCM (phase change material), for example, the PCM is encapsulated into microcapsules to be add into the second coating layer 40. The fiber sheet 30 can be PCM or made from/of PCM. Generally, the phase changing temperature of the coating is different from the phase changing temperature of the fibers to widen the temperature interval of energy storage.

The method for preparing the wall-cloth with a laminated core coated through infiltration can be carried on according to the example 6.

Comparison 1

A wall-paper is pasted to the surface of the wall by organic adhesive agent. Emulsion paint is coated on the surface of the wall-paper.

Operating a solidification process for the emulsion paint and the organic adhesive agent.

Comparison 2

A wall-cloth is pasted to the surface of the wall by inorganic coating (such as inorganic dry-powder coating).

Inorganic coating (such as inorganic dry-powder coating) is coated on the surface of the wall-paper.

Operating a solidification process for the Inorganic coatings.

Comparison 3

A glass fiber cloth is pasted to the surface of the wall by inorganic coating (such as inorganic dry-powder coating).

Inorganic coating (such as inorganic dry-powder coating) is coated on the surface of the glass fiber cloth.

Operating a solidification process for the Inorganic coatings.

Comparison 4

A 2D net sheet (such as window screen) is pasted to the surface of the wall by inorganic coating (such as inorganic dry-powder coating). The net sheet is wove by single longitude line and single latitudes line Inorganic coating (such as inorganic dry-powder coating) is coated on the surface of the 2D net sheet.

Operating a solidification process for the Inorganic coatings.

The coating layers in the Comparison 1 to comparison 4 have a same thickness with the Example 1.

The texture and the tear-resistance of the present invention and the comparisons are listed in the following table 1.

TABLE 1 texture and tear-resistance of the examples and the comparisons

| | Decorative effect | Gap between adjacent units | Tear-resistance |
|---|---|---|---|
| Example 1 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 2 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 3 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 4 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 5 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 6 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 7 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 8 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 9 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Example 10 | Obvious textures, 3D pattern is formed, tactility similar with flannelette | No visible gap between adjacent units; it is unable to tear the wall-cloth from any edge of any unit | The coating layer is unable to be tore, and unable be peeled off form the wall unless the wall is destroyed |
| Comparison 1 | Obvious textures, no 3D patter is formed, no tactility like the present invention | conspicuous gap between adjacent units; it is easy tear the wall-cloth from any edge of any unit | The coating layer is easy to be tore, and easy to be peeled off form the wall |
| Comparison 2 | Obvious textures, no 3D patter is formed, tactility similar with flannelette only when flocking wall-cloth is used | conspicuous gap between adjacent units; it is easy tear the wall-cloth from any edge of any unit | The coating layer is easy to be tore, and easy to be peeled off form the wall |
| Comparison 3 | No texture, no 3D patter is formed; the thickness of the second layer shall be much thicker than the present invention for reducing hypersensitive reaction of the glass fiber. | Only one unit can be used to avoid gap, or else, it is unable to offset the gap; | The coating layer is unable to be tore, however, it is easy to peel off the glass fiber cloth form the wall |
| Comparison 4 | Monotonous texture, no texture similar with wall-paper or wall-cloth, no 3D patter is formed. | conspicuous gap between adjacent units | The coating layer is unable to be tore, and unable be peeled off form the wall unless the wall is destroyed |

Overall, the present invention obtains obvious texture and excellence tear-resistance. Particularly, no visible gap between adjacent units occurs, and continuous texture and pattern can be obtained, as shown in FIG. 7. There is conspicuous gap between adjacent units and easy tearing when the coating layer is made by using wall-paper. The coating layer made by using glass fiber cloth or 2D net sheet obtains only monotonous or imperceptible texture without the texture effect of a wall-cloth, and obtains conspicuous gap between adjacent units.

The invention claimed is:

1. A method for preparing a wall-cloth having a laminated core, the method comprising:
 applying a fiber sheet on a surface of a prime coating layer when the prime coating layer solidifies, the fiber sheet comprising fibers of a network structure;
 applying a second coating layer on a surface of the fiber sheet;
 exerting pressure on the second coating layer against the prime coating layer to allow coating material of the second coating layer to moisten the fibers and to permeate into meshes of the network structure, thereby forming a laminated core layer; and solidifying the laminated core layer to form the wall-cloth with the laminated core;

wherein the second coating layer is transparent or semi-transparent;

wherein the network structure possesses a 3D interpenetrating network with the fibers spread in 3D directions;

wherein at least a part of the fibers interweave in at least two layers, and the fibers in different layers cross each other to form meshes spreading in different directions;

wherein junctions of the fibers in one of the layers locate in a mesh or meshes of another one of the layers, and a direction of the fiber in one layer or at least some layers are different with a direction of the fibers in another layer or other layers;

wherein the junctions of the fibers are linkable together to form connection points by melting and/or cohering, and a percent of the connection points is 1% to 100%;

wherein the fiber of the fiber sheet has a diameter of 1 µm-5000 µm, the fiber sheet has a thickness of 0.1 mm-10 mm and has a density of 10 to 300 g/m$^2$;

wherein the meshes of the fiber sheet have an aperture size of 0.1 mm to 10 mm;

wherein at least one of the prime coating layer, the second coating layer, and the fiber sheet comprises a bacterial inhibitor or a substance that releases the bacterial inhibitor; or at least one of the prime coating layer, the second coating layer, and the fiber sheet comprises an electrically conductive substance to provide a function of electromagnetic shielding; or at least one of the prime coating layer, the second coating layer, and the fiber sheet comprises a magnetic substance to provide a function of magnetic absorption, which allows attachment to a surface of an object by magnetic force; or at least one of the prime coating layer, the second coating layer, and the fiber sheet comprises a phase change material to provide a function of thermal storage through phase transition; or at least one of the prime coating layer and the second coating layer comprises a waterproof layer; or at least one of the prime coating layer and the second coating layer comprises a fireproof coating; or the fiber sheet comprises a fireproof sheet or a non-combustible sheet; or the second coating layer is an anti-graffiti layer; or the prime coating layer is a thermal insulation layer.

2. The method of claim 1, wherein applying the fiber sheet on the surface of the prime coating layer comprises applying a pressure-sensitive adhesive agent having a paster to the prime coating layer, and wherein applying the second coating layer comprises removing the paster while at least a part of the fiber sheet retains its position on the surface of the prime coating layer.

3. The method of claim 1, wherein solidifying the laminated core layer comprises:
forming one or more deeper dents at the meshes of the network structure which allow permeation of the coating material of the second coating layer; and
forming no dent or one or more shallower dents at a surface of the fibers which restricts permeation of the coating material of the second coating layer, thereby forming a texture or textures on an outer surface of the wall-cloth.

4. The method of claim 1, further comprising, prior to applying the fiber sheet on the surface of the prime coating layer, applying the prime coating layer on a surface of an object.

5. The method of claim 4, wherein applying the prime coating layer comprises:
applying a sealing prime layer on the surface of the object; and
applying a colored prime layer on a surface of the sealing prime layer before or when the sealing prime layer solidifies.

6. The method of claim 5, wherein applying the fiber sheet on the surface of the prime coating layer comprises applying the fiber sheet on a surface of the colored prime layer when the colored prime layer solidifies.

7. The method of claim 1, wherein the fiber sheet comprises at least a pattern made by different structures penetrating the fiber sheet, said structures including one or more of a concavity, a bulge, and a die-cutting.

8. The method of claim 7, further comprising, prior to applying the fiber sheet on the surface of the prime coating layer, treating the fiber sheet by one or more of the following:
a) flattening one surface or opposite surfaces of the fiber sheet;
b) applying one or more coating materials to a surface of the fibers to change a function or functions of the fiber sheet, wherein said one or more coating materials gradually change a water absorption rate of the fiber sheet from one end of the fiber sheet to a second end of the fiber sheet;
c) dyeing one or more colors to the fiber sheet, wherein said one or more colors gradually change from one end of the fiber sheet to the other end of the fiber sheet;
d) pasting a film or films on one surface or both surfaces of the fiber sheet, thereby reserving at least a part of openings connecting the meshes of the fiber sheet;
e) mold pressing the fiber sheet to form an indented pattern on a surface of the fiber sheet;
f) die cutting the fiber sheet to form a pattern penetrating the fiber sheet; and
g) modifying the fiber sheet by using a dipping process.

* * * * *